May 29, 1951 S. M. WAAS 2,554,802
POPCORN MACHINE
Filed July 10, 1948 2 Sheets-Sheet 1

Inventor
Samuel M. Waas
By
Fishburn & Mullendore
Attorneys

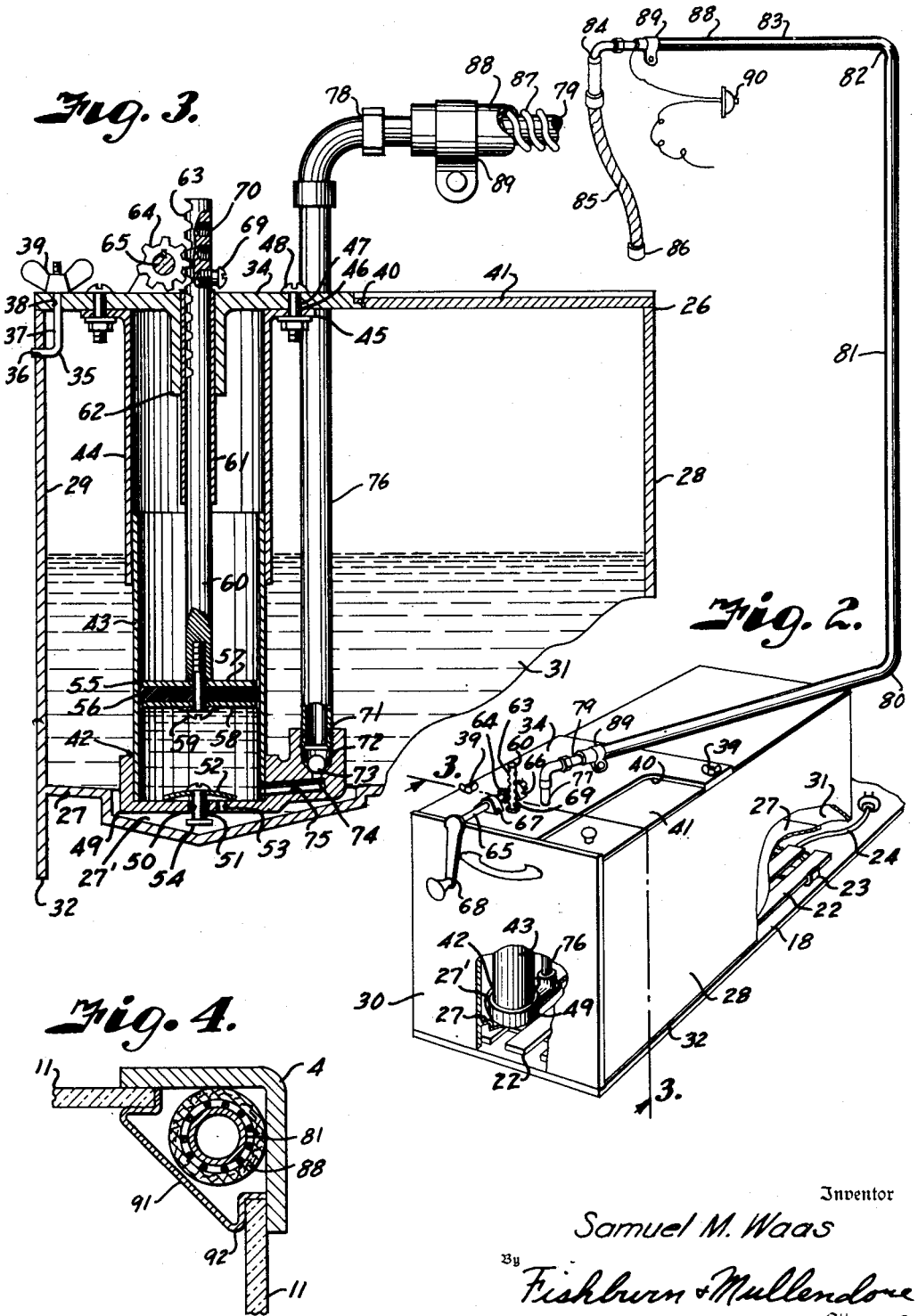

Patented May 29, 1951

2,554,802

UNITED STATES PATENT OFFICE 2,554,802

POPCORN MACHINE

Samuel M. Waas, Kansas City, Mo., assignor to Manley, Inc., Kansas City, Mo., a corporation of Missouri Application July 10, 1948, Serial No. 38,129

2 Claims. (Cl. 99—238.4)

This invention relates to popcorn machines and more particularly to a device of that character having apparatus for storing, warming and delivering a suitable seasoning medium for popcorn popped in the machine, the principal objects of the invention being to provide for maintenance of a supply of seasoning oil at suitable temperatures to keep said oil liquid and delivering measured quantities of said oil to a popcorn cooking device.

In corn popping apparatus particularly such apparatus as is used in theatres and other public places in the vending of popcorn, the corn is usually seasoned with an oil or cooked in the presence of an oil such as cocoanut or a paraffin base oil, and at normal atmospheric temperatures the seasoning oil has a tendency to solidify. Since pots, kettles and similar containers are ordinarily employed for storing the seasoning oil and pouring it over the popped corn or into the kettle, solidification of the oil often occurs in and about the containers to their detriment in appearance and functional characteristics. It has also heretofore been the practice to lodge containers of popcorn seasoning oil in and/or about cooking display or temporary storage devices such as compartments for popped popcorn, the result of which frequently occasions such inconveniences as loss of the oil by accidently turning over the oil container and loss of sales of the popcorn by reason of the unpleasant appearance of solidified oil drippings about the oil container and popcorn display compartment, as well as other disadvantages.

Other objects of the present invention are, therefore, to obviate the noted inconveniences and disadvantages encountered in popcorn machines heretofore available; to provide for housing popcorn seasoning oil containers in convenient concealable relation to popcorn treating and display devices and in the same popcorn machine; to provide for heating the oil to liquefy the same when desired for popcorn seasoning purposes; to provide a seasoning oil delivery apparatus in which the oil is subjected to heat to maintain said oil in a liquid condition throughout the apparatus; to provide a seasoning oil storage with a pump subjected to heated oil and capable of accurately metering the oil dispensed thereby; to provide a seasoning oil apparatus for confining said oil and conducting same in a sanitary closed system to the cooking kettle; to provide a convenient relatively economical and highly efficient seasoning oil handling apparatus which is neat in appearance and eliminates unsightly grease conditions in a corn popping machine; and to provide improved elements and arrangements of them in popcorn machines of this character.

In accomplishing these and other objects of the present invention, I have provided improved details of structure, the preferred form of which is illustrated in the accompanying drawings, wherein:

Fig. 2 is a detail perspective view of the seasoning oil container and associated handling apparatus.

Fig. 3 is a transverse sectional view through the seasoning oil container on the line 3—3, Fig. 2.

Fig. 4 is a sectional view through a corner of the popcorn machine on the line 4—4, Fig. 1, particularly illustrating the position of the seasoning oil duct therein.

Figure 1:
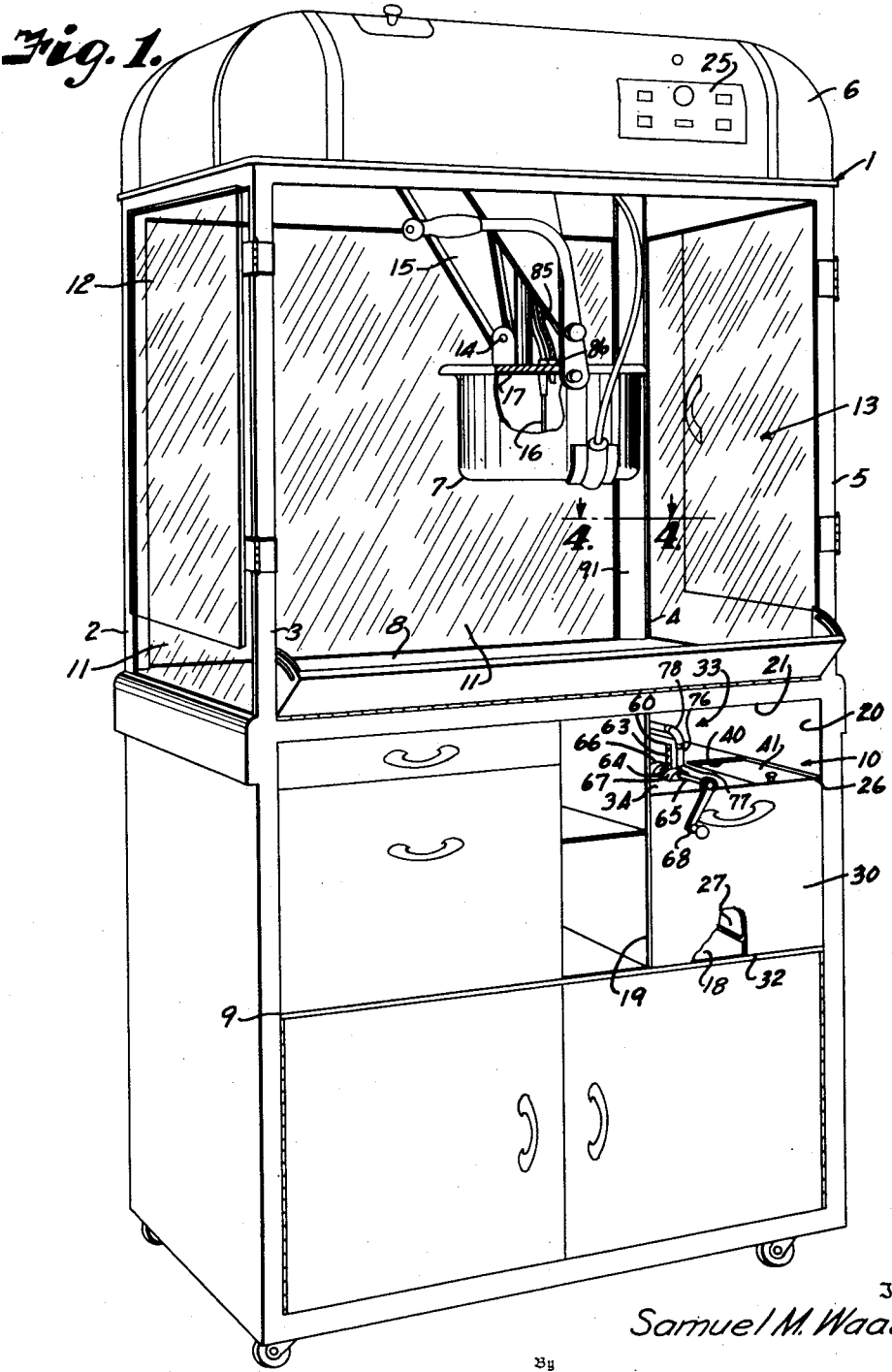
Fig. 1 is a perspective view of a popcorn machine embodying the present invention.

Referring more in detail to the drawings:

1 generally designates a popcorn machine in which the present invention may be conveniently embodied, the machine preferably including vertically arranged structural members 2, 3, 4 and 5 provided with a suitable primary support (not shown) at their lower ends and with a suitable hood 6 at and interconnecting their upper ends from which depends a suitable popcorn cooking element 7, such as the kettle shown. Suitable horizontally arranged structural members and panels bracingly interconnect the vertical structural members between their ends and provide respective supports for the hood 6, display compartment floor 8, drawer and storage compartments 9 and a seasoning well 10. Suitable transparent display panels 11 may be provided between the side and rear frame forming vertical structural members above the display compartment floor 8, and suitable panel-filled door frames 12 may be hinged to the front forming structural members to provide closure of and access to a display compartment 13 formed thereby. The cooking kettle 7 preferably is hingedly supported as at 14 on brackets 15 depending from the hood 6, said kettle having an agitator carried by a shaft 16 rotatably mounted in the lid 17 of the kettle, said shaft being rotated by means of a motor (not shown).

18 designates a floor member for the seasoning well 10 which is supplemented by side walls 19 and 20, a top wall 21, and a rear wall (not shown) to form the well 10, the well as a whole being suitably supported by the structural members in the lower portion of the machine. The well 10 preferably has an open front and is arranged below the display compartment 13 and to one side of the floor 8 thereof, as shown in Fig. 1. Electric heating elements 22 are mounted on the floor member 18, in spaced relation thereto, by means of suitable supports 23, said heating elements being supplied with energy by a conductor 24 adapted to be connected in the electric circuit of the popcorn machine and controlled from a switch panel 25 mounted on the front of the hood as shown in Fig. 1.

A seasoning oil container 26 is slidably mounted in the well 10, said container preferably consisting of a bottom 27, side walls 28 and 29 and front and rear walls 30 and 31, all preferably cast integral and so arranged that the bottom wall 27 is spaced above the lower edge 32 of the front and side walls. The bottom 27 slopes downwardly from the walls of the container to provide drainage of the contents thereof into a sump 27' of suitable size and arrangement to cooperate with a pump in permitting removal of substantially all of the seasoning oil from said container. The rear wall also terminates at its lower end at the bottom wall whereby the container 26 may be slid into the well 10 and the lower edge of the rear wall and the bottom will pass over the heating elements 22 and said heating elements will be between the floor 18 and the bottom 27, to provide heat for the container to maintain the oil therein in liquid condition. The side, front and rear walls of the container are shorter in height than the well 10 to provide a space 33 above the container to accommodate portions of the apparatus as later described.

The container preferably has a cover 34 resting on the upper edges of the side walls and suitably secured thereto as by bolts 35 having portions extending through apertures 36 in said side walls and threaded shanks 37 extending through apertures 38 in said cover, wing nuts 39 being threaded on the shanks 37 to clamp the cover 34 on said container. The cover preferably has an opening 40 providing access to the container for refilling with seasoning oil as desired. The opening 40 is adapted to be closed by a door 41 to completely enclose the seasoning oil during use.

Mounted on the cover 34 and depending into the container in alignment with the sump 27' is a pump 42 preferably consisting of a cylinder 43 having its upper end welded or otherwise suitably secured to a bracket 44 having flanges 45 adapted to engage the bottom surface of the cover 34, said flanges and cover having aligning apertures 46 and 47 for receiving suitable fastening devices 48, such as bolts and nuts, for securing the bracket 44 to the cover plate. The lower end of the cylinder 43 extends into the sump 27' in spaced relation to the bottom thereof and mounted on the lower end of said cylinder is a head 49 closing the lower end of said cylinder. Said head has an aperture 50 slidably mounting a shank 51 carrying a spring-type valve 52 thereon and arranged in the cylinder in such a manner as to control the opening of a port 53 in response to a variation of pressure in the cylinder, said valve shank having a stop 54 on the lower end to limit the upward movement thereof. The sump 27' is slightly larger than the head to permit free flow of seasoning oil into the sump, and said head is so arranged relatively to the bottom of the sump to provide clearance for operation of the valve shank. However, the spring between the head and bottom of the sump is small whereby substantially all of the seasoning oil may be removed from the container by the pump. Reciprocable in the cylinder is a piston 55 consisting of a resilient expandable member 56 such as rubber or other suitable material held between plates 57 and 58 and secured by a screw 59 to the lower end of a piston rod 60 which is slidably mounted in a bushing 61 carried in a boss 62 depending from the cover 34 and arranged coaxially with the cylinder 43. The upper portion of the rod 60 has teeth 63 therein to form a rack adapted to mesh with the teeth of a pinion 64 keyed to a shaft 65 rotatably mounted in spaced ears 66 and 67 extending upwardly from the cover 34 and arranged on opposite sides of the pinion to provide support therefor. The shaft 65 projects forwardly of the container and mounts a crank 68 in a position for convenient operation whereby rotation of the crank will move the piston 55 in the cylinder 43. A stop 69 is preferably arranged on the rod 60 in such a manner as to limit downward movement of the pistons and the lower end of the bushing 61 is positioned adjacent the upper end of the cylinder 43 whereby the engagement of the piston with the end of the bushing 61 limits the upward movement of the piston. The selective arrangement of the stop 69 in the vertically spaced headed bores 70 in the rod 60 varies the length of stroke of the piston before engagement of the stop with the upper surface of the cover limits the downward movement of the piston, thereby controlling the displacement of oil from said cylinder to vary the amount of the seasoning delivered by the pump.

The head 49 is provided with a laterally extending boss having a vertically arranged threaded bore 71 therein terminating in a seat 72 adapted to be engaged by a ball valve 73 to close a port 74 leading to a lateral passage 75 communicating with the interior of the cylinder 43. Threaded into the threaded bore 71 is a tube 73 extending upwardly through an aperture 77 in the cover 34, the upper end of said tube being connected by suitable fittings 78 with a tube 79 which extends toward a rear corner of the machine and is turned upwardly as at 80 to form a vertical portion 81 which is arranged adjacent the structural angle 4 forming a portion of the frame of the display compartment. The tube extends upwardly into the hood 6 and is turned as at 82 to form a horizontal portion 83 which extends over the central portion of the kettle 7. The end of the tube is preferably connected by a suitable fitting 84 with flexible tubing 85, the lower end 86 of which is connected by a suitable fitting providing communication with the interior of the kettle, the flexible tubing 85 maintaining communication with said kettle during pivotal movement thereof.

A heater wire 87 enclosed in a suitable sheath is wrapped around the tube 79 substantially for the full length thereof, said tube and wire being enclosed with a suitable heat insulating material 88, the ends of which are clamped to the tube as at 89, the heater wire being connected to the electrical switch 90 for energizing the heater to liquefy the oil in the tube 79, it being necessary to so energize the heater wire only momentarily at such times when there has been a substantial lapse of time between the last popping of corn and desired movement of oil through the tube.

In order to enhance the appearance of the machine and to enclose the portion of the tube extending upwardly adjacent the structural member 4, a trim strip 91 preferably extends upwardly inside of the display compartment adjacent the corner structural members, and the side edges of said strip are bent as at 92 to form angle-shaped seats adapted to engage the ends of the panels 11 as shown in Fig. 4. This arrangement also encloses a passage through the display compartment for accommodating the tube 79.

The operation of a popcorn machine constructed as described is as follows:

The container 26 is slid into the well 10 and the fitting 78 connected to the end of the tube 79. The door 41 is removed and a suitable quantity of seasoning medium placed in the container. The stop 69 is adjusted on the rod 60 whereby downward movement of the piston 55 will displace the desired amount of seasoning oil. When it is desired to pop corn, a suitable switch on the switch panel 25 is operated to electrically connect the heating elements 22 into the service line circuit to energize said heating elements and apply heat to the bottom of the container. After a short interval the seasoning oil will be in liquid condition and the heat applied thereto may be reduced as by a thermostat or other suitable control to maintain the seasoning oil at desired temperatures. A suitable switch is actuated to bring into the electrical circuit the heat-elements in the kettle to apply the desired heat thereto. Corn may then be applied to the kettle and by turning the crank 68 the shaft 65 will be rotated to rotate the pinion 64 and move the rod 60 and piston 55 upwardly in the cylinder 43. Upward movement of the piston will effect seating of the valve 72 and upward movement of the valve 52 to open the port 53 and draw seasoning oil into the cylinder 43. The crank 68 is turned until the piston engages the lower end of the bushing 61. The crank 68 is then turned in the opposite direction to move the piston and the rod downwardly in the cylinder, effecting seating of the valve 52 to close the port 53 and lifting of the valve 72 to open the port 73 whereby the seasoning oil in the cylinder 43 is discharged through the tube 77, tube 79 and flexible tube 85 to the kettle 7, movement of the crank continuing until the stop 69 engages the top of the cover 34 whereby the desired amount of seasoning oil is delivered to the kettle 7. If some interval has elapsed since the last corn was popped, the oil contained in the tube 79 may have congealed or solidified. In such case the pushbutton switch 90 is operated to energize the heating wire 87 to apply momentary heat to the tube 79 to melt the oil contained therein prior to the operation of the pump. After the kettle of corn has been popped it is dumped into the display compartment by tilting of the kettle 7. The kettle is then ready for another batch of popcorn which may be placed in the kettle and the crank 68 again operated to deliver a measured quantity of oil to the kettle for the cooking of corn therein.

It is apparent, therefore, that a popcorn machine has been provided by the present invention in which the seasoning oil is concealed and enclosed to maintain same in a sanitary condition and to enhance the general appearance of the popcorn machine by eliminating solidified oil drippings from the display compartment of the machine.

What I claim and desire to secure by Letters Patent is:

1. In a popcorn machine having a cabinet including a display compartment and a covered cooking kettle pivotally mounted in the display compartment for tilting to empty the kettle, said covered kettle having a portion which opens for access to the kettle for filling and emptying the kettle, a container in the cabinet below the display compartment and adapted for containing a supply of seasoning oil, a cover mounted on the container for closing same, an electric heater under and substantially contacting the container for applying heat thereto for maintaining the oil in liquid condition, a cylinder in the container and having one end fixed to the cover and the other end immersed in the oil, a head on the immersed end of the cylinder and having an inlet and outlet, check valves in said inlet and outlet to prevent backflow therethrough, a piston slidable in the cylinder, a piston rod fixed to the piston and extending through the container cover, means mounted on the cover and engaging the piston rod for effecting reciprocation of the rod and piston for moving seasoning oil through the inlet and outlet, a tube having one end communicating with the cylinder outlet and the other end communicating with the interior of the kettle for delivering seasoning oil therein in response to reciprocation of the piston in the cylinder, and an insulated heating element around substantially the length of the tube for applying heat thereto for melting solidified oil therein, and means for selectively energizing said heating element.

2. In a popcorn machine having a cabinet including a display compartment and a covered cooking kettle pivotally mounted in the display compartment for tilting to empty the kettle, said covered kettle having a portion which opens for access to the kettle for filling and emptying the kettle, a container in the cabinet below the display compartment and adapted for containing a supply of seasoning oil, a cover mounted on the container for closing same, an electric heater under and substantially contacting the container for applying heat thereto for maintaining the oil in liquid condition, a cylinder in the container and having one end fixed to the container cover and the other end immersed in the oil, a head on the immersed end of the cylinder and having an inlet and outlet, check valves in said inlet and outlet to prevent backflow therethrough, a piston slidable in the cylinder, a piston rod fixed to the piston and extending through the container cover, means mounted on the container cover and engaging the piston rod for effecting reciprocation of the rod and piston for moving seasoning oil through the inlet and outlet, stop means for limiting the movement of the piston rod, a tube having one end communicating with the cylinder outlet and extending from the container to a point above the cooking kettle, an insulated heating element around substantially the length of the tube for applying heat thereto for melting solidified oil therein, means for selectively energizing said heating element, and a flexible duct having communication with the end of the tube and the interior of the kettle for delivering seasoning oil therein in response to reciprocation of the piston in the cylinder.

SAMUEL M. WAAS.

REFERENCES CITED

The following references are of record in the file of this patent:

UNITED STATES PATENTS

| Number | Name | Date |
|---|---|---|
| 1,422,768 | Kent | July 11, 1922 |
| 1,823,653 | Hast | Sept. 15, 1931 |
| 2,134,088 | Obdyke | Oct. 25, 1938 |
| 2,288,248 | Long | June 30, 1942 |

FOREIGN PATENTS

| Number | Country | Date |
|---|---|---|
| 3,153 | Sweden | Oct. 29, 1891 |